United States Patent [19]

Buchner

[11] Patent Number: 4,643,606

[45] Date of Patent: Feb. 17, 1987

[54] LOCKING FASTENER

[75] Inventor: Richard P. Buchner, New Burlington, Ohio

[73] Assignee: General Electric Company, Cincinnati, Ohio

[21] Appl. No.: 667,658

[22] Filed: Nov. 2, 1984

[51] Int. Cl.⁴ .............................................. F16D 1/00
[52] U.S. Cl. ..................................... 403/24; 403/259; 403/320; 411/197
[58] Field of Search .................... 403/259, 320, 24; 411/132, 136, 134, 143, 144, 148, 191, 197, 198, 202, 324

[56] References Cited

U.S. PATENT DOCUMENTS 1,390,944  9/1921  Webb .................................. 411/197

FOREIGN PATENT DOCUMENTS 1359717  3/1964  France ................................. 411/191
350838   1/1961  Switzerland ......................... 411/197
868155   9/1981  U.S.S.R. .............................. 411/132

Primary Examiner—Andrew V. Kundrat
Attorney, Agent, or Firm—Gregory A. Welte; Derek P. Lawrence

[57]  ABSTRACT

In the invention, a noncylindrical sleeve deforms when a cylindrical nut is threaded into it. The deformation inhibits rotation of the nut because the sleeve is restrained against rotation.

3 Claims, 4 Drawing Figures

U.S. Patent  Feb. 17, 1987  4,643,606
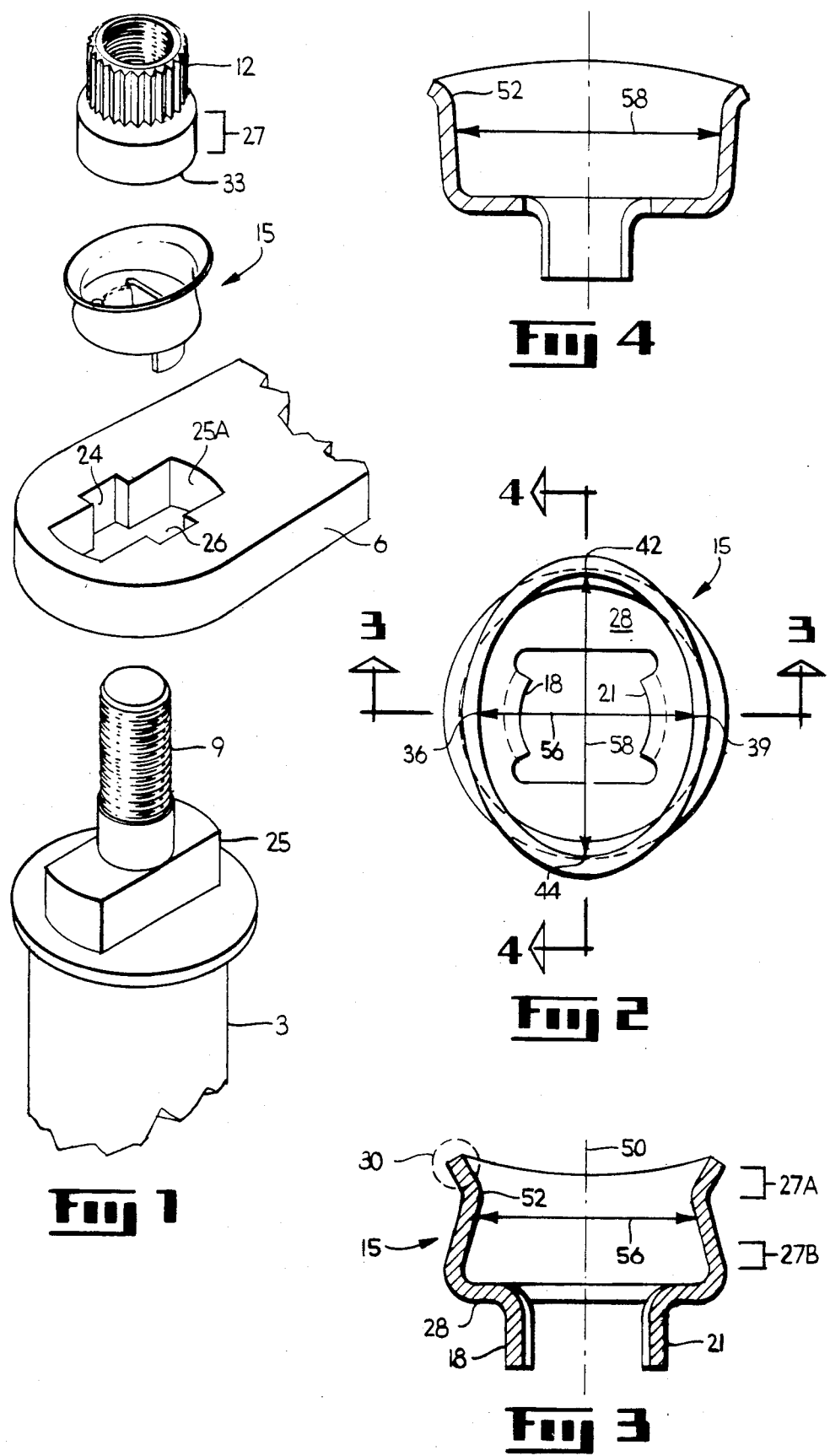

LOCKING FASTENER

The Government has rights in this invention pursuant to Contract No. F33657-82-C-0257 awarded by the Department of the Air Force.

The present invention relates to a device which provides the function of a lock washer.

BACKGROUND OF THE INVENTION

In an environment subject to high vibration, nuts and bolts must be secured to prevent their loosening. Sometimes, a lock washer of the type having radially extending tabs are used. During assembly, a tab is bent upward to contact a flat of the nut or head of the bolt to thereby prevent rotation. Such lock washers take time to assemble.

OBJECTS OF THE INVENTION

It is an object of the present invention to provide a lock washer substitute which requires no additional assembly steps once its associated nut and bolt have been assembled.

SUMMARY OF THE INVENTION

In one form of the invention, a noncylindrical sleeve deforms when a cylindrical nut is threaded into it. The deformation inhibits rotation of the nut because the sleeve is restained against rotation.

BRIEF DESCRIPTION OF THE DRAWING

FIG. 1 illustrates one form of the present invention.
FIG. 2 illustrates a top view of the present invention.
FIG. 3 illustrates a cross-sectional view of the present invention in the direction of arrows 3—3 in FIG. 2.
FIG. 4 illustrates a second cross-sectional view of the present invention in the direction of arrows 4—4 in FIG. 2.

DETAILED DESCRIPTION OF THE INVENTION

FIG. 1 illustrates a shaft 3 which is driven by a actuator arm 6. The shaft can be used, for example, to actuate stators in a gas turbine engine compressor or turbine (not shown) and this actuation is well known in the gas turbine engine art. The shaft 3 bears a threaded spindle 9 onto which a nut 12 is threaded. (Commonly, the nut 12 is of the self-locking type.)

The present invention includes a locking sleeve 15 having two tabs 18 and 21 in FIG. 3 which mate with slots 24 and 26 in the actuating arm 6 in FIG. 1. The tabs 18 and 21 inhibit rotation of the locking sleeve 15 with respect to the arm 6. Since the arm 6 is keyed to the shaft 3 by key 25 and keyway 25A, the rotation of the locking sleeve 15 with respect to the shaft 3 is inhibited.

The base region 27 of the nut 12 is cylindrical. However, an upper region 27A in FIG. 3 of the locking sleeve 15 is generally elliptical as shown in FIG. 2, while a base region 27B in FIG. 3 is generally circular. Further, the locking sleeve 15 contains a flare 30 in FIG. 3 which cooperates with the bottom edge 33 in FIG. 1 of the nut 12 to deform the locking sleeve from its original, elliptical shape into a shape more conforming to the cylindrical shape of the base 27 of the nut 12. Thus, the sleeve 15 applies a frictional locking force which is largest at points 36 and 39 (which are diametrically opposed) in FIG. 2 and which decreases to the lower values at points 42 and 44 (also diametrically opposed).

Characterized another way, the present invention includes a circular base region 28 in FIG. 3. A sleeve extends upward from the base 28 and includes two regions: a lower region 27B (near the base 28) which is cylindrical, and an upper region 27A (near the flare 30) which is elliptical. The transformation from cylindrical to elliptical causes the sleeve to slope inward, toward axis 50, in the cross section viewed in the direction of arrows 3—3 in FIG. 2, and to slope outward, away from the axis 50, when viewed in the direction of arrows 4—4 in FIG. 2.

Characterized in still another way, the circumference of the sleeve is the same everywhere, in the lower region 27B as well as in the upper region 27A, but not the same above point 52 in FIG. 3. Point 52 defines the beginning of the flare 30. The circumference is equal to the circumference of the cylindrical region 27 of the nut 12 in FIG. 1, subject to difference affecting the tightness of fit desired between the nut 12 and locking sleeve 15. However, at all regions above the cylindrical base region 27B, a minor diameter 56 exists which is less than a major diameter 58 in FIGS. 2-4. Thus, the upper region 27A is generally elliptical. Of course, in the cylindrical base region 27B, the major and minor diameters are equal.

An invention has been described which comprises a locking sleeve for locking a nut to a threaded shaft which necessitates only the insertion of the sleeve onto the shaft followed by installation of the nut. No subsequent steps are necessary to lock the nut to the shaft.

Numerous substitutions and modifications can be undertaken without departing from the true spirit and scope of the present invention. For example, tabs 18 and 21 need not be located directly beneath the nut. They can, for example, extend outside the circumference of the locking sleeve and fit into a slot properly located. Further, the invention can be used to lock the head of a bolt against rotation, rather than locking a nut as described. Of course, the bolt head must contain a cylindrical region analagous to region 27 in FIG. 1.

What is desired to be secured by Letters Patent of the United States is the invention as defined in the following claims.

I claim:

1. A locking device for retaining a nut on a threaded shaft, the nut having a generally cylindrical region, comprising:
   (a) sleeve means which is generally elliptical into which the cylindrical bolt region fits upon threading and which deforms to apply friction to the cylindrical bolt region, and
   (b) tab means for inhibiting rotation of the sleeve means.

2. In a gas turbine engine having an actuator shaft for manipulating stators which bears a threaded stud through which is fastened an actuating arm, the improvement comprising:
   (a) at least one recess in the actuating arm
   (b) a sleeve located between the nut and the arm, the sleeve having the following characteristics
      (i) at least one tab for engaging the recess to prevent rotation of the sleeve with respect to the arm
      (ii) a generally elliptical shape is deformed into a cylindrical shape by entry of the cylindrical region of the nut (iii) a flared region for facilitating the entry of the cylindrical nut region.

3. A fastener for inhibiting rotation of a nut on a spindle, the nut having a region which is generally cylindrical, comprising:
 (a) a sleeve which has a generally cylindrical region and a generally elliptical region near the cylindrical region, the generally elliptical region being deformable into a shape which conforms to that of the cylindrical region of the nut; and
 (b) tab means for inhibiting rotation of the fastener with respect to the spindle.

* * * * *